US009857795B2

(12) United States Patent
Gupta et al.

(10) Patent No.: US 9,857,795 B2
(45) Date of Patent: Jan. 2, 2018

(54) SYSTEM AND METHOD FOR TRAJECTORY PLANNING FOR UNEXPECTED PEDESTRIANS

(71) Applicant: HONDA MOTOR CO., LTD., Minato-ku, Tokyo (JP)

(72) Inventors: Rakesh Gupta, Saratoga, CA (US); Robert Cofield, Bessemer, AL (US)

(73) Assignee: HONDA MOTOR CO., LTD., Tokyo (JP)

(*) Notice: Subject to any disclaimer, the term of this patent is extended or adjusted under 35 U.S.C. 154(b) by 141 days.

(21) Appl. No.: 15/079,917

(22) Filed: Mar. 24, 2016

(65) Prior Publication Data

US 2017/0277192 A1 Sep. 28, 2017

(51) Int. Cl.
*G05D 1/02* (2006.01)
*G05D 1/00* (2006.01)

(52) U.S. Cl.
CPC ......... *G05D 1/0212* (2013.01); *G05D 1/0088* (2013.01)

(58) Field of Classification Search
CPC .......... G05D 1/02; G05D 1/00; G05D 1/0212; G05D 1/0088
See application file for complete search history.

(56) References Cited

U.S. PATENT DOCUMENTS

| | | | |
|---|---|---|---|
| 6,151,539 A | 11/2000 | Bergholz et al. | |
| 8,121,749 B1 | 2/2012 | Agrawal et al. | |
| 8,781,669 B1 | 7/2014 | Teller et al. | |
| 8,954,252 B1 | 2/2015 | Urmson et al. | |
| 9,156,473 B2 | 10/2015 | Clarke et al. | |
| 2009/0102411 A1* | 4/2009 | Miller | G05B 19/19 318/573 |
| 2012/0010767 A1 | 1/2012 | Phillips et al. | |
| 2013/0054128 A1 | 2/2013 | Moshchuk et al. | |
| 2014/0207325 A1* | 7/2014 | Mudalige | B62D 15/025 701/26 |
| 2014/0207364 A1 | 7/2014 | Eidehall et al. | |
| 2014/0253722 A1 | 9/2014 | Smyth | |
| 2015/0210279 A1 | 7/2015 | Agnew et al. | |
| 2016/0077505 A1* | 3/2016 | Dirkx | G05B 17/02 700/275 |
| 2016/0313133 A1 | 10/2016 | Zeng et al. | |

\* cited by examiner

*Primary Examiner* — Yonel Beaulieu
*Assistant Examiner* — Martin A Weeks
(74) *Attorney, Agent, or Firm* — Arent Fox LLP

(57) ABSTRACT

A trajectory planning system for an autonomous vehicle fits a jerk profile including a plurality of phases within a set of acceptable parameters, a jerk value being constant within each phase of the jerk profile. The system parameterizes the jerk profile based on an initial velocity, an initial acceleration, a final velocity, and a final acceleration for the first segment. The system then integrates the jerk profile to determine a first trajectory function, the first trajectory function including a speed for the vehicle at a given time. The system guides the vehicle along the first segment of the path according to the first trajectory function. The system detects an unplanned obstacle along the first segment of the path. The system plans a second trajectory function for a second segment of the path between a current location of the vehicle and a location on the path before the unplanned obstacle.

17 Claims, 13 Drawing Sheets

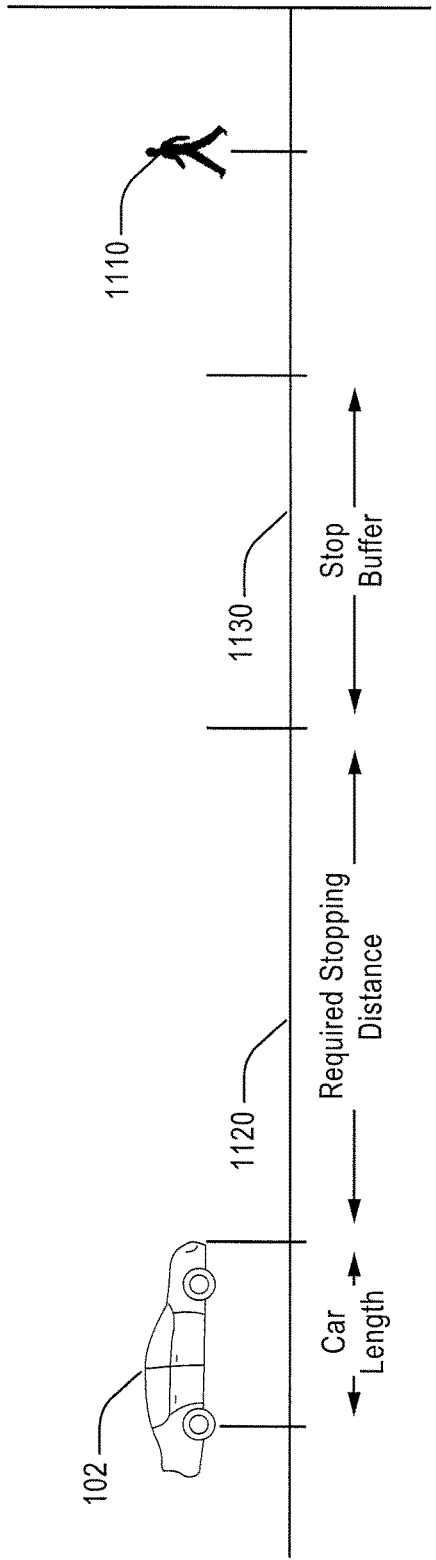
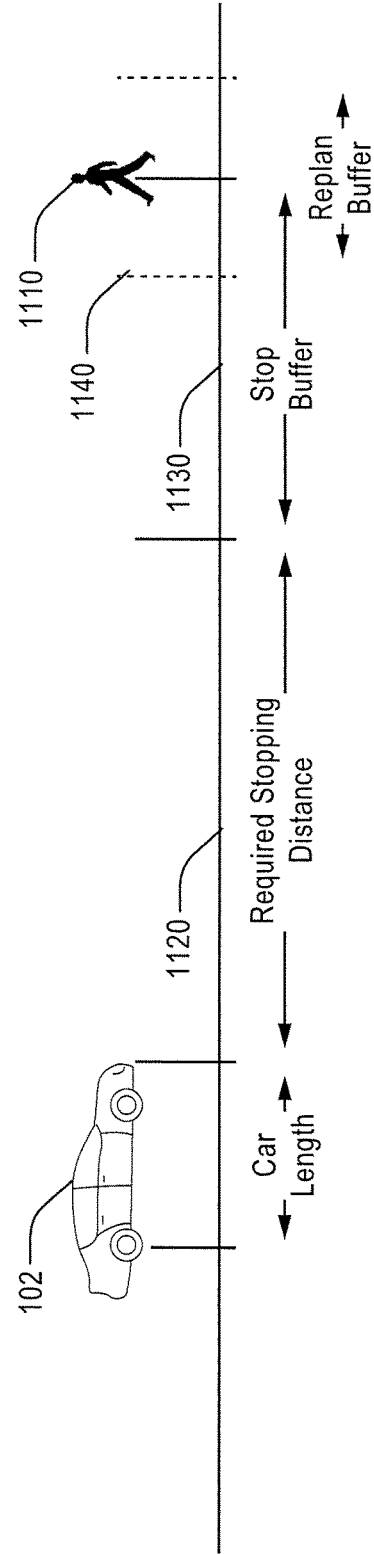
FIG. 11
FIG. 12

SYSTEM AND METHOD FOR TRAJECTORY PLANNING FOR UNEXPECTED PEDESTRIANS

BACKGROUND

Although not commercially available, various autonomous vehicles are under development. Such autonomous vehicles include control systems for navigating the autonomous vehicle. The control systems are capable of optimizing the speed of the vehicle based on constraints imposed by the road. Autonomous vehicles generally navigate on highways in the presence of other vehicles, which are expected to follow typical behavioral patterns of vehicles. Accordingly, the autonomous vehicle may plan a path to avoid the other vehicles while attempting to optimize the speed of the vehicle.

Urban environments pose challenges for navigation of autonomous vehicles. Not only does the autonomous vehicle determine a route to follow, the autonomous vehicle also accounts for unpredictable factors, such as pedestrians. Although pedestrian detection and response is a recognized problem, autonomous vehicles typically handle pedestrians separately from standard speed control. Accordingly, stopping for a pedestrian may not be well-integrated into the vehicle's speed planning. When a vehicle reacts to an unpredictable factor, a sudden change in vehicle behavior may subject passengers to unexpected forces, reducing passenger comfort. For example, the first derivative of acceleration, also known as "jerk," is associated with the forces experienced by the passenger. Stopping for a pedestrian may generate a high level of negative jerk as the vehicle rapidly decelerates to avoid contact with the pedestrian. This high level of jerk may cause passengers to feel uncomfortable or even unsafe in the autonomous vehicle.

In view of the foregoing, there is a need for trajectory planning for autonomous vehicles that provides passenger comfort by controlling jerk while stopping for unexpected obstacles. Further advantages will become apparent from the disclosure provided below.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter. According to one aspect of the present disclosure, a method of autonomous guidance of a vehicle is provided. The method may include fitting a jerk profile including a plurality of phases within a set of acceptable parameters including: a positive jerk constraint, a negative jerk constraint, a positive acceleration constraint, and a negative acceleration constraint for a segment of a planned travel path. A jerk value may be constant within each phase of the jerk profile. The method may also include parameterizing the jerk profile based on an initial velocity, an initial acceleration, a final velocity, and a final acceleration for the first segment. The method may also include integrating the jerk profile to determine a first trajectory function including a speed for the vehicle at a given time. The method may further include travelling the first segment of the path according to the first trajectory function. The method may also include detecting an unplanned obstacle along the first segment of the path. The method may further include planning a second trajectory function for a second segment of the path between a current location of the vehicle and a location on the path before the unplanned obstacle.

In another aspect of the present disclosure, a system for autonomous control of a vehicle is provided. The system may include a map database providing map data including a path for the vehicle. The system may also include a detection system determining a position of an unplanned obstacle on the path. The system may further include a processor: fitting a jerk profile including a plurality of phases within a set of acceptable parameters including a positive jerk constraint, a negative jerk constraint, a positive acceleration constraint, and a negative acceleration constraint for a segment of a planned travel path, a jerk value being constant within each phase of the jerk profile. The processor may also parameterize the jerk profile based on an initial velocity, an initial acceleration, a final velocity, and a final acceleration for the first segment. The processor may also integrate the jerk profile to determine a first trajectory function, the first trajectory function including a speed for the vehicle at a given time. The processor may also guide the vehicle along the first segment of the path according to the first trajectory function. The processor may also detect an unplanned obstacle along the first segment of the path using the detection system. The processor may also plan a second trajectory function for a second segment of the path between a current location of the vehicle and a location on the path before the unplanned obstacle.

In another aspect of the present disclosure, a non-transitory computer-readable medium storing computer executable code for guiding an autonomous vehicle is provided. The non-transitory computer readable medium may include code to fit a jerk profile including a plurality of phases within a set of acceptable parameters including: a positive jerk constraint, a negative jerk constraint, a positive acceleration constraint, and a negative acceleration constraint for a segment of a planned travel path, a jerk value being constant within each phase of the jerk profile. The code may further include code to parameterize the jerk profile based on an initial velocity, an initial acceleration, a final velocity, and a final acceleration for the first segment. The code may further include code to integrate the jerk profile to determine a first trajectory function, the first trajectory function including a speed for the vehicle at a given time. The code may further include code to guide the vehicle along the first segment of the path according to the first trajectory function. The code may further include code to detect an unplanned obstacle along the first segment of the path. The code may further include code to plan a second trajectory function for a second segment of the path between a current location of the vehicle and a location on the path before the unplanned obstacle.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative aspects of the disclosure when read in conjunction with the accompanying drawings, wherein:

FIG. 11 illustrates an exemplary scenario for a pedestrian within a path, in accordance with aspects of the present disclosure;

FIG. 12 illustrates another exemplary scenario for a pedestrian within a path, in accordance with aspects of the present disclosure;

DETAILED DESCRIPTION

Figure 1:
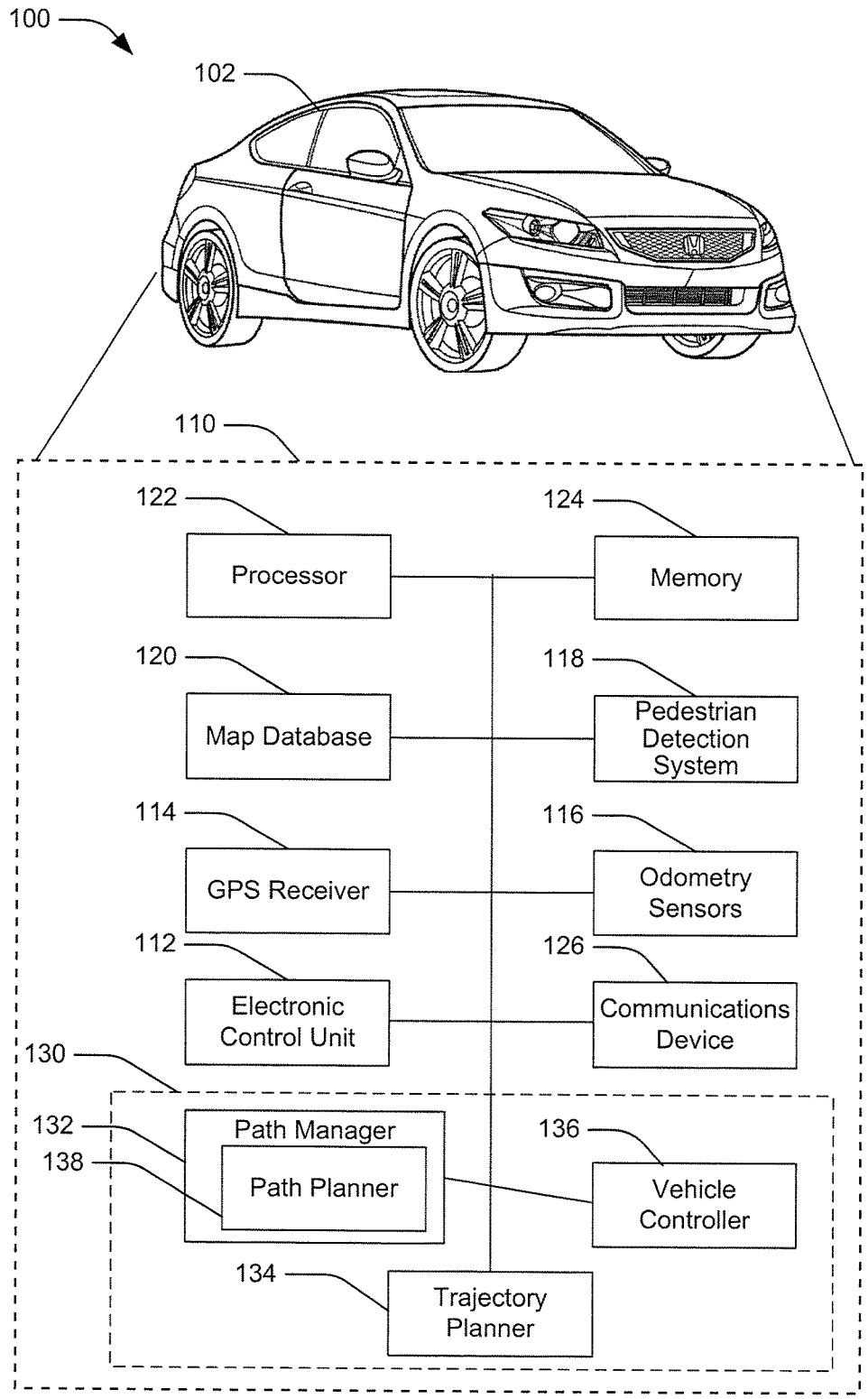
FIG. 1 illustrates a schematic view of an example operating environment of a trajectory planning system in accordance with aspects of the present disclosure.

The following includes definitions of selected terms employed herein. The definitions include various examples and/or forms of components that fall within the scope of a term and that may be used for implementation. The examples are not intended to be limiting.

The term "jerk" as used herein may refer to a change in acceleration. In an aspect, jerk may be the derivative of acceleration with respect to time.

The term "trajectory" as used herein may refer to any of the interrelated aspects of position, speed, acceleration, or jerk along a path.

A "processor," as used herein, processes signals and performs general computing and arithmetic functions. Signals processed by the processor may include digital signals, data signals, computer instructions, processor instructions, messages, a bit, a bit stream, or other computing that may be received, transmitted and/or detected.

A "bus," as used herein, refers to an interconnected architecture that is operably connected to transfer data between computer components within a singular or multiple systems. The bus may be a memory bus, a memory controller, a peripheral bus, an external bus, a crossbar switch, and/or a local bus, among others. The bus may also be a vehicle bus that interconnects components inside a vehicle using protocols, such as Controller Area network (CAN), Local Interconnect Network (UN), among others.

A "memory," as used herein may include volatile memory and/or non-volatile memory. Non-volatile memory may include, for example, ROM (read only memory), PROM (programmable read only memory), EPROM (erasable PROM) and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and/or direct RAM bus RAM (DRRAM).

An "operable connection," as used herein may include a connection by which entities are "operably connected", is one in which signals, physical communications, and/or logical communications may be sent and/or received. An operable connection may include a physical interface, a data interface and/or an electrical interface.

A "vehicle," as used herein, refers to any moving vehicle that may be capable of carrying one or more human occupants and is powered by any form of energy. The term "vehicle" includes, but is not limited to: cars, trucks, vans, minivans, SUVs, motorcycles, scooters, boats, personal watercraft, and aircraft. In some cases, a motor vehicle includes one or more engines.

Generally described, the present disclosure provides for guidance of an autonomous vehicle. Planning a trip for an autonomous vehicle may include both path planning and trajectory planning. In path planning, a route for navigating the vehicle from a starting location to an ending location may be determined. The path may include a series of specific lanes and turns that the autonomous vehicle may travel to reach the ending location. Trajectory planning may include determining a speed of the autonomous vehicle along the selected path. Trajectory planning may account for both planned stops (e.g., stop signs) and unplanned stops (e.g., pedestrians).

The current disclosure provides for trajectory planning that provides a comfortable ride for passengers of the autonomous vehicle. One factor indicative of passenger comfort is jerk. Changes in longitudinal acceleration may cause passengers to move relative to the autonomous vehicle. Another factor in passenger comfort is lateral acceleration. This disclosure provides for limiting jerk, while otherwise maximizing speed to provide a comfortable and fast trajectory along the planned path. The current disclosure may account for unplanned stops using similar trajectory planning techniques to provide an integrated system for trajectory planning.

Turning to FIG. 1, a schematic view of an example operating environment 100 of a vehicle guidance system 110 and example methods according to an aspect of the disclosure is provided. The vehicle guidance system 110 may reside within a vehicle 102. The components of the vehicle guidance system 110, as well as the components of other systems, hardware architectures, and software architectures discussed herein, may be combined, omitted or organized into different implementations.

The vehicle 102 may generally include an electronic control unit (ECU) 112 that operably controls a plurality of vehicle systems. The vehicle systems may include, but are not limited to, the vehicle guidance system 110 among others including vehicle HVAC systems, vehicle audio systems, vehicle video systems, vehicle infotainment systems, vehicle telephone systems, and the like. The vehicle guidance system 110 may include a vehicle global positioning system (GPS) receiver 114 that may also be connected to the ECU 112 to provide a location of the vehicle 102, as described in further detail below. Alternatively, the vehicle guidance system 110 may include its own processor 122 and memory 124 that communicate with the GPS receiver 114, odometry sensors 116, pedestrian detection system 118, map database 120, and trajectory planning system 130, for example, to plan a trajectory for the vehicle 102.

The ECU 112 may include internal processing memory, an interface circuit, and bus lines for transferring data, sending commands, and communicating with the vehicle systems. The ECU 112 may include a processor and memory, not shown. The vehicle 102 may also include a bus for sending data internally among the various components of the vehicle guidance system 110. The vehicle 102 may further include a communications device 126 (e.g., wireless modem) for providing wired or wireless computer communications utilizing various protocols to send/receive electronic signals internally with respect to features and systems within the vehicle 102 and with respect to external devices. These protocols may include a wireless system (e.g., IEEE 802.11, IEEE 802.15.1 (Bluetooth®)), a near field communication system (NFC) (e.g., ISO 13157), a local area network (LAN), and/or a point-to-point system. Additionally, the communication device of the vehicle 102 may be operably connected for internal computer communication via a bus (e.g., a CAN or a LIN protocol bus) to facilitate data input and output between the electronic control unit 104 and vehicle features and systems.

The vehicle 102 may include odometry sensors 116 that may control and provide data regarding movement of the vehicle. For example, the odometry sensors may include an engine control unit, not shown, that provides vehicle speed, idle speed, and engine throttle positions. The odometry sensors 116 may include a transmission control unit, not shown, to provide data regarding the vehicle transmission, i.e., power train, system. For example, the engine control unit and/or the transmission control unit may provide data to the ECU 112 and/or vehicle systems (e.g., the trajectory planning system 130) with respect to whether the vehicle 102 is or is not in a state of motion.

The odometry sensors 116 may also include but are not limited to a vehicle speed sensor, e.g., wheel speed sensors, and a brake signal sensor. The vehicle speed sensor may provide speed data related to the vehicle 102 as it is in operation. Thus, the vehicle speed sensor may provide data to the ECU 112 and/or the trajectory planning system 130 as to whether the vehicle 102 is or is not in a state of motion. The brake signal sensor may sense signals that are sent from the vehicle braking system and/or a brake light switch to determine when the vehicle brakes are engaged or disengaged by the driver or the vehicle controller 136. The brake signal sensor may also include brake pad sensors that provide actuation data each time the brake pads of the vehicle 102 are utilized to provide vehicle braking. The brake signal sensor may also provide information as to when the vehicle 102 is not in a state of motion.

The vehicle 102 may also include a pedestrian detection system 118 for detecting, identifying, and classifying pedestrians. The pedestrian detection system 118 may include a camera for obtaining a camera image of an environment around the vehicle 102. The camera may be mounted in a forward facing orientation to obtain an image from a perspective similar to the perspective of the driver. The camera may be mounted near the top of a front windshield of the vehicle 102. The camera may be or include a digital camera capable of obtaining high quality digital images or video. The pedestrian detection system 118 may also include radar or LIDAR. The pedestrian detection system 118 may identify potential pedestrians as well as projected movement of the pedestrians. The pedestrian detection system 118 may determine locations of the pedestrians with respect to the vehicle 102. The pedestrian locations may be translated into a global position for comparison to map information. Further, the pedestrian detection system 118 may classify or filter pedestrians, based on their locations, as being safe or as being potential obstacles. The pedestrian detection system 118 may pass information regarding a closest pedestrian to the trajectory planning system 130 to determine whether a change in path or trajectory is necessary. The pedestrian detection system 118 may continue to track pedestrians determined to be potential obstacles. For example, the pedestrian detection system may compare a new location of the pedestrian to a previous location to determine whether the pedestrian has moved. When a pedestrian moves to a location that is outside of the vehicle path, the pedestrian may be reclassified as a safe pedestrian. The pedestrian detection system 118 may determine that the pedestrian has cleared the path.

The vehicle 102 may include a map database 120. The map database 120 may be a computer-readable storage medium storing three-dimensional map data. The three-dimensional map data may be downloaded or updated via communications device 126. For example, the vehicle guidance system 110 may communicate with a map server, not shown, to obtain three-dimensional map data to store in the map database 120. The three-dimensional map data may include data points corresponding to various features. The features may include both planar, e.g., flat, features and features having a vertical component. For example, the three-dimensional map data may include features such as, but not limited to, continuous and dashed lane markings, curbs, crosswalks, road markings, and traffic signs. The data points may correspond to a real-world feature at a specific location defined by three-dimensional coordinates. The three-dimensional map data may include annotations identifying the features and/or providing groupings of data points. Additionally, the map data may include speed limits associated with each segment of the road.

The vehicle 102 may implement trajectory planning using a trajectory planning system 130 including a path manager 132 for determining a path of the vehicle 102 including one or more segments, a trajectory planner 134 for determining a trajectory for each segment, and a vehicle controller 136 for sampling the trajectory to control the vehicle 102. The trajectory planning system 130 may use any of the components of the vehicle guidance system 110, for example, as sources of input. The trajectory planning system 130 may also include any of the components of the vehicle guidance system 110 or additional components. The components of the trajectory planning system 130, as well as the components of other systems, hardware architectures, and software architectures discussed herein, may be combined, omitted or organized into different architectures for various implementations.

The path manager 132 may include a processor configured to determine a path of the vehicle 102 including one or more segments. For example, the path manager 132 may be implemented by the processor 122 executing instructions stored in memory 124, or by a separate processor and memory. The path manager 132 may obtain a location from the GPS receiver 114 and map information from the map database 120. The path manager 132 may receive a user input of the ending location. The path manager 132 may include a path planner 138 for determining a path for the vehicle 102 based on a routing algorithm, for example, using nodes to select a least cost path in terms of travel time or distance. The path planner 138 may provide a lane level path for an entire trip between a starting location and an ending location. The path manager 132 may also perform high-level planning for a trip from the current location to the ending location. For example, the path manager 132 may determine the location of stop signs along the selected path. The path manager 132 may plan stops for the vehicle 102 at each stop sign and plan to wait until the associated intersection is clear before continuing. The path manager 132 may divide the path into one or more sub-paths based on planned stops, where the vehicle may come to a complete stop for an unspecified length of time. The path manager 132 may further segment a sub-path into one or more segments based on constraints. A segment may refer to a portion of a path or sub-path having similar characteristics. For example, a straight section of road having a constant speed limit (a legal constraint) may be represented as a segment. In another example, the path manager 132 may segment a school zone having a lower speed limit as a different segment. Road characteristics, such as a curvature or grade, may impose performance constraints and also be segmented into different sections, as described in detail below. The path manager 132 may call the trajectory planner 134 to determine a trajectory for each segment. The path manager 132 may plan reactive stops based on a detected pedestrian. The path manager 132 may determine a collision risk for a pedestrian, determine whether to implement a change in path and/or a change in trajectory, and then call the trajectory planner 134 to implement the updated path and/or trajectory. The path manager 132 may be implemented as a finite state machine as described in further detail below with respect to FIG. 2.

The trajectory planner 134 may include a processor to determine a trajectory for the vehicle 102 for a current or upcoming segment. For example, the trajectory planner 134 may be implemented by the processor 122 executing instructions stored in memory 124, or by a separate processor and memory. As discussed in detail below, the trajectory planner may determine a trajectory for each segment based on constraints for the segment and a desired jerk limit. The trajectory may include one-dimensional functions of time, e.g., a position, speed, and/or acceleration function. The trajectory planner 134 may determine the speed of the vehicle without explicitly considering the direction. Speed constraints due to turning may be inherent in the constraints for a segment of road. Steering may be performed based on the current location and the selected path. The trajectory planner 134 may provide samples of the trajectory to the vehicle controller 136. The trajectory planner 134 may use trajectory tracking to adjust for drift between the reference time for the trajectory and an actual position of the vehicle.

The vehicle controller 136 may include a processor to provide a control signal for the vehicle 102 to guide the vehicle along the selected path according to the determined trajectory. The vehicle controller 136 may be implemented by the processor 122 executing instructions stored in memory 124, or by a separate processor and memory. The vehicle controller 136 may govern the engine speed, braking, and steering, for example. The vehicle controller 136 may receive input trajectory samples from the trajectory planner 134 at a rate of approximately 10 Hz. The sample may span approximately 2 seconds. The vehicle controller 136 may control the vehicle 102 to match the sampled trajectory over the span.

Figure 2:
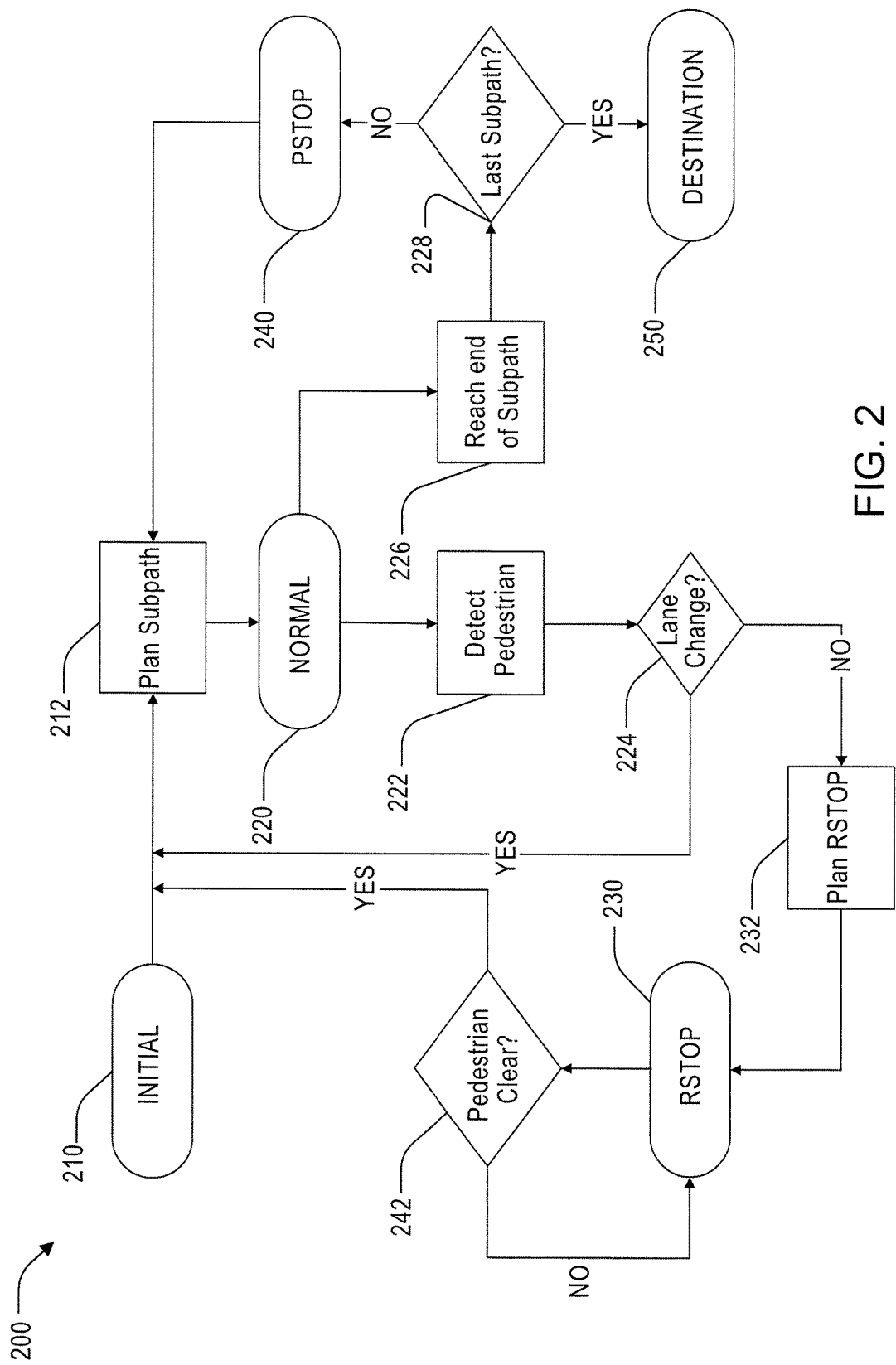
FIG. 2 illustrates a state diagram showing operation of an exemplary trajectory planning system in accordance with aspects of the present disclosure.

FIG. 2 is a state diagram 200 illustrating an example of operation of the path manager 132. The path manager 132 may be in an initial state 210, a normal state 220, a reactive stop (RSTOP) state 230, a planned stop (PSTOP) state 240, or a destination state 250. The path manager 132 may be in the initial state 210 when first starting. The path manager 132 may receive user input, as well as information from vehicle systems, including the GPS receiver 114 and map database 120. When the information is collected, in block 212, the path manager 132 may plan a subpath. For example, the path manager 132 may segment a subpath between the current location and a first planned stop location into one or more segments. The path manager 132 may pass the segments to the trajectory planner 134 (FIG. 1) for determining the trajectory. Once the subpaths are planned, the path manager 132 may transition to the normal state 220.

In the normal state 220, the path manager 132 may be continuously monitoring for events while the vehicle 102 is following the determined path according to the trajectory. One event may be detection of a pedestrian, for example. In block 222, the path manager 132 may receive a signal from the pedestrian detecting system 118 indicating the presence of a pedestrian. In block 224, the path manager 132 may determine whether a lane change for avoiding the pedestrian is feasible. If a lane change is feasible, the path manager 132 may return to block 212 to re-plan the subpath including the lane change. If a lane change is not feasible or not desired, the path manager 132, in block 232 may plan a reactive stop 232. For example, the path manager 132 may send the trajectory planner 134 segment information for a segment stopping before the location of the pedestrian. The path manager 132 may then transition to the RSTOP state 230.

In the RSTOP state 230, vehicle 102 may be stopped or coming to a stop according to the planned stopping trajectory. The path manager 132 may determine whether the pedestrian has cleared the path. In block 242, if the pedestrian has not cleared the path, the path manager 132 may remain in the RSTOP state 230. If the pedestrian has moved within the path, the path manager 132 may return to block 212 to plan another segment having another stop before the new pedestrian location. If the pedestrian has cleared the path, the path manager 132 may plan a new subpath from the current location in block 212 and transition to the normal state 220.

Returning to the normal state 220, if the path manager 132 detects that the vehicle 102 has reached the end of the current subpath 226, the path manager 132 may, in block 228, determine whether the current subpath was the last subpath in the path. If the current subpath is the last subpath, the path manager 132 may transition to the destination state 250. If the current subpath is not the last subpath, the path manager 132 may transition to the PSTOP state 240.

In the PSTOP state 240, the path manager 132 may cause the vehicle 102 to wait for a defined time, e.g., 2 seconds. The path manager 132 may plan the next subpath in block 212. After the defined time, the path manager 132 may transition to the normal state 220.

Figure 3:
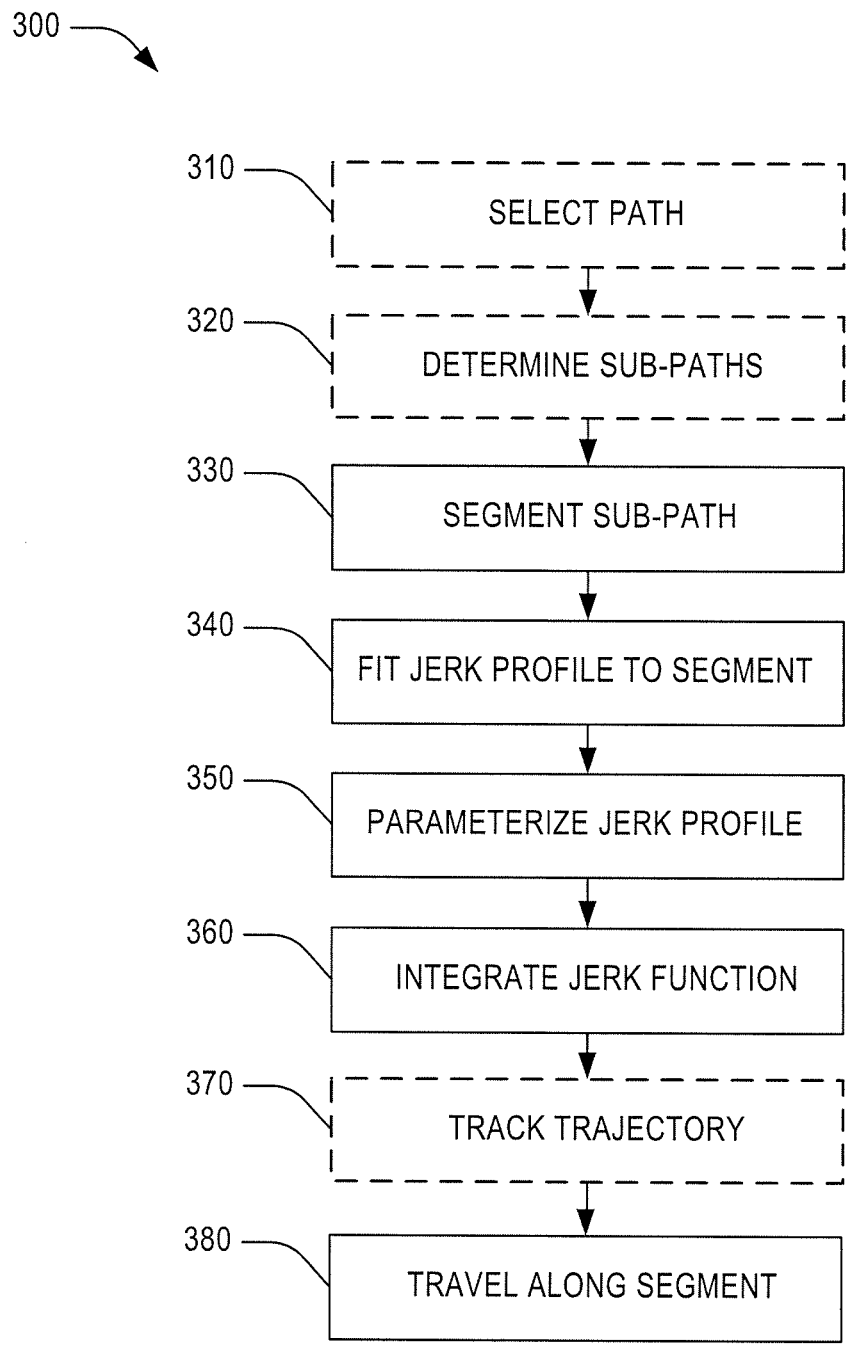
FIG. 3 illustrates a flowchart showing an exemplary method for trajectory planning that may be utilized by an embodiment of the trajectory planning system in accordance with aspects of the present disclosure.

Referring now to FIG. 3, an example method that may be utilized by an example aspect of the trajectory planning system 110 is illustrated. In block 310, the method 300 may optionally include selecting a path. In an aspect, for example, the path manager 132 or a separate path planner may select a path for the vehicle 102. The separate path planner may be a separate navigation system. The path may be or include a series of roads or lanes within the roads that may take the vehicle 102 from a starting location to a destination location.

In block 320, the method 300 may include determining one or more subpaths of the path. The path manager 132 may determine the subpaths of the path. The path manager 132 may break the path into subpaths according to known stops, e.g., stop signs, along the path. Traffic lights may be treated similarly to pedestrians, for example, rather than as fixed stops.

In block 330, the method 300 may include segmenting a subpath. The trajectory planner 134 may segment the subpath into one or more segments. Each segment may have similar constraints. An example method for segmenting a subpath will be described in further detail below regarding FIG. 4.

In block 340, the method 300 may include fitting a jerk profile, including a plurality of phases, to constraints for the segment. The trajectory planner 134 may fit the jerk profile to the segment. The trajectory planner 134 may select a profile from a set of predefined jerk profiles. The predefined jerk profiles may each include a plurality of phases where the jerk is constant in each phase. A seven-phase profile, which will be shown in FIG. 6, may be used for many situations where a length of the segment does not impose limits. The seven-phase profile may include a first phase of increasing acceleration (i.e., positive jerk), a second phase of constant acceleration (i.e., zero jerk), a third phase of decreasing acceleration (i.e., negative jerk), a fourth phase of no acceleration (i.e., zero jerk), a fifth phase of increasing deceleration (i.e., negative jerk), a sixth phase of constant deceleration (i.e., zero jerk), and a seventh phase of decreasing deceleration (i.e., positive jerk). The seven-phase profile may also include deceleration before acceleration. Other predefined jerk profiles may include a six-phase profile, a 4-phase profile, a reversed 4-phase profile, and a 3-phase profile, which will be described in detail below. In order to fit a jerk profile to a segment, the trajectory planner 134 may use ranges of acceptable jerk and acceleration parameters. Default acceptable ranges may be used initially and later modified up to maximum parameter values if a profile is not feasible for a segment. The default ranges may be defined by a negative acceleration parameter ($a^-_p$), i.e., deceleration, a positive acceleration parameter ($a^+_p$) and a negative jerk parameter ($j^-_p$) and a positive jerk parameter ($j^+_p$). The maximum ranges may be defined by a maximum negative acceleration ($a^-_m$), i.e., deceleration, a maximum positive acceleration ($a^+_m$) and a maximum negative jerk ($j^-_m$) and a maximum positive jerk ($j^+_m$). A cascade approach may be used to test the feasibility of each of the pre-defined profiles (in descending order of number of phases) until a feasible profile is selected.

In block 350, the method 300 may include parameterizing a jerk profile for a segment. Each segment may be defined by a vector $b=[v_i, a_i, L, v_m, v_f]$. The initial segment speed ($v_i$) may be set to a current vehicle speed if planning from the current position, or set to a final segment speed of a previous segment. Similarly, initial segment acceleration ($a_i$) may be set to a current vehicle acceleration if planning from the current position, or set to 0 if planning for a future segment. The length may be determined based on the determined start and end points of the segment. The maximum speed ($v_m$) may be set based on constraints such as a legal speed limit and vehicle performance constraints, for example. A final segment speed ($v_f$) may be set based on a maximum speed of the next segment, or set to 0 if the current segment is for stopping, for example. The parameterized jerk profile may then be solved for the duration of each phase. The trajectory planner 134 may solve the parameterized jerk profile using a symbolic solver to determine a duration of each phase. A solution may be considered feasible when the duration of each phase is positive.

In block 360, the method 300 may include integrating the jerk profile to determine the trajectory function. The trajectory planner 134 may integrate the jerk profile to determine a trajectory function. Because jerk is held constant during each phase, the acceleration function during each phase may be linear, the speed function may be a quadratic, and the position may be a cubic. The functions may be based on a reference time, which may, for example, be the start of the segment.

In block 370, the method 300 may include tracking a trajectory of the vehicle 102 with respect to the trajectory function. The trajectory planner 134 may track the trajectory of the vehicle 102 with respect to the trajectory function. Trajectory tracking may account for drift between a reference time and the actual time based on actual performance of the vehicle 102. The trajectory planner 134 may project the current vehicle position onto the segment. The trajectory planner 134 may convert a vehicle position, e.g., from GPS, to a distance within the current segment. The trajectory planner 134 may then determine a cumulative distance along the segment between a start point and the projected vehicle current position. The trajectory planner 134 may then determine a reference time for the trajectory function based on the cumulative distance. For example, the trajectory planner 134 may solve a position function for the cumulative distance to determine the reference time. The reference time may then be used to sample the speed and/or acceleration functions to provide a control signal for the vehicle 102 to the vehicle controller 136.

In block 380, the method 300 may include travelling the segment of the path according to the trajectory function. The vehicle 102 may travel the segment of the path according to the trajectory function. The vehicle controller 136 may provide the control signals to the systems of the vehicle 102. The vehicle controller 136 may receive samples from one or more trajectory functions and determine inputs to the vehicle 102 accordingly. The inputs to the vehicle 102 may vary depending on the specific vehicle 102. The vehicle controller 136 may guide the vehicle 102 along the segment of the path according to the trajectory function.

Figure 4:
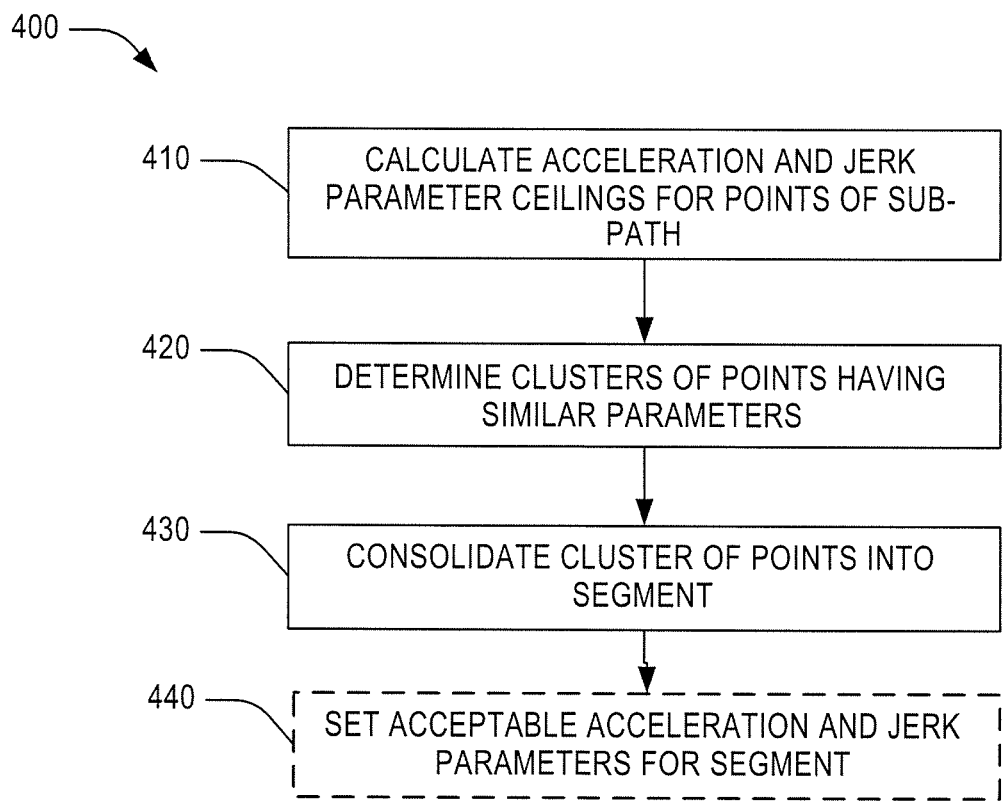
FIG. 4 illustrates a flowchart showing an exemplary method for segmenting a path that may be utilized by an embodiment of the trajectory planning system in accordance with aspects of the present disclosure.

Referring now to FIG. 4, an example method 400 that may be utilized by an example aspect of the trajectory planning system 110 (FIG. 1) for segmenting a subpath is illustrated. The method 400 may be performed by the trajectory planner 134. In block 410, the method 400 may include calculating acceleration and jerk parameter ceilings for points of the subpath. The ceiling calculation may be a minimax problem. Each of the scalars in b, $a_m$, and $j_m$ may be a minimum of several maxima computed from a set of applicable constraints for points on the subpath. For example, acceleration constraints may include a set of limits derived from friction coefficients at every point along the subpath. The constraints of legal speed limit and lateral acceleration limit may be used as constraints for $v_m$. Lateral acceleration constraints may be translated into longitudinal speed constraints using approximation in the following expression:

$$v_{m,k_p}(a_{B,y}) = \sqrt{a_{B,y}^{max}/K_{k_p}} \tag{1}$$

The constraints may be determined for each waypoint, $k_p$, between 1 and $N_p$, where $N_p$ is the number of waypoints in the subpath. The value $K_{k_p}$ denotes the path curvature at each point. For each suppath point, the value $v_{m,k_p}$ ($\alpha_{B,y}^{max}$) denotes the speed typically to obtain the limit lateral acceleration, denoted by $\alpha_{B,y}^{max}$.

In block 420, the method 400 may include determining clusters of points having similar parameters. Various known clustering algorithms may be used. For example, a simple univariate heuristic may be used to identify curves in the roadway using the speed ceiling (SL). Each time that $v_m$,k<SL becomes true, a curve is beginning, and a segment boundary may be drawn. Each time that $v_m$,k=SL is once again true, the current curve has ended, and another segment boundary may be drawn.

In block 430, the method 400 may include consolidating a cluster of points to determine parameters for the segment. The minimum scalar across all constituent points within the segment may be selected to prevent violation of any constraint. Straight portions of the subpath may have a $v_m$ equal to the legal speed limit, and in curved portions, the $v_m$ may be set to the value required to obtain $\alpha_{B,y}^{max}$ for the entirety of the curve.

In block 440, the method 400 may optionally include setting maximum acceleration and jerk parameters for the segment. The initial maximum acceleration and jerk parameters may be default values. However, different values may be provided, for example, along with the map information.

Figure 5:
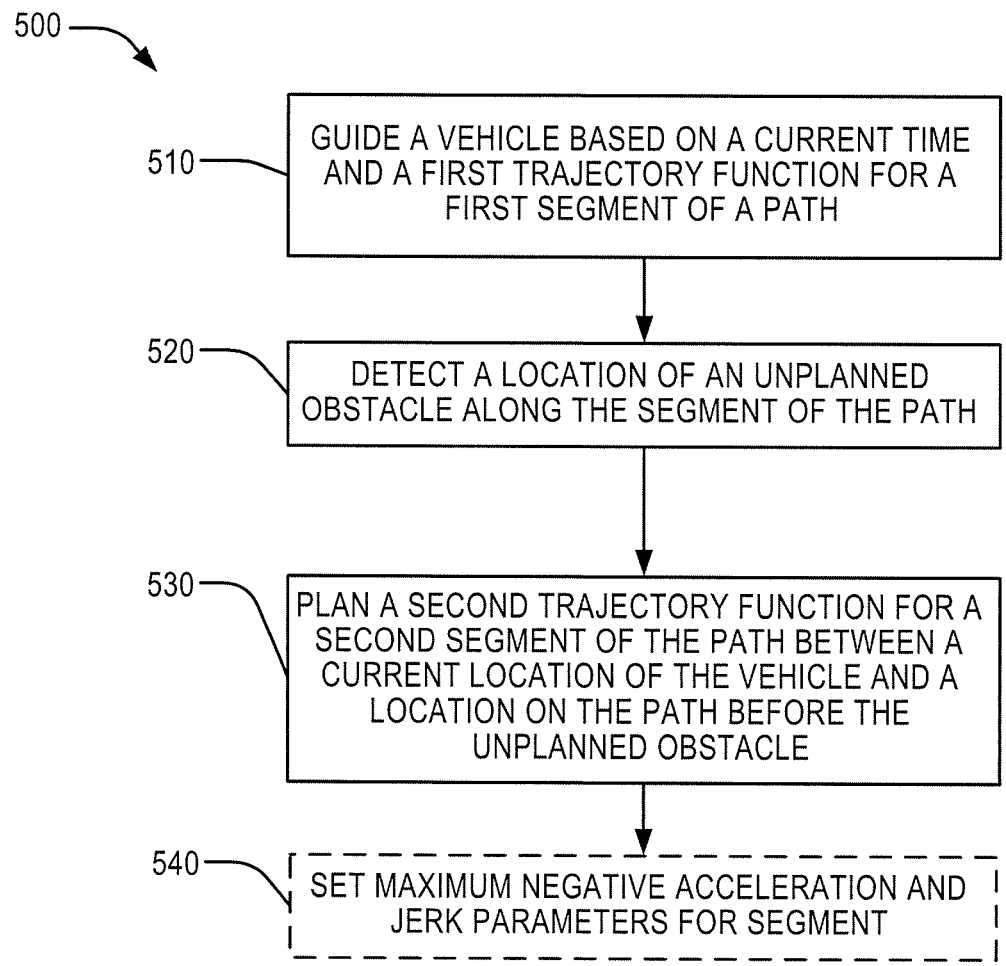
FIG. 5 illustrates a flowchart showing an exemplary method for reacting to unplanned obstacles that may be utilized by an embodiment of the trajectory planning system in accordance with aspects of the present disclosure.

Referring now to FIG. 5, an exemplary method 500 that may be utilized by an example aspect of the trajectory planning system 110 for planning a reactive stop is described. In block 510, the method 500 may include providing a control signal to a vehicle based on a sample for a current time from a first trajectory function for a first segment of a path. The vehicle controller 136 may provide a control signal to the vehicle 102 based on a sample for a current time from the first trajectory function from the first segment of the path. The trajectory function may provide a speed at a given time.

In block 520, the method 500 may include detecting a location of an unplanned obstacle along the segment of the path. In an aspect, for example, the pedestrian detection system 118 may detect the location of the unplanned obstacle along the segment of the path. The unplanned obstacle may be a pedestrian, but other unplanned obstacles, such as animals, vehicles, or traffic lights, may also be detected.

In block 530, the method 500 may include planning a second trajectory function for a second segment of the path between a current location of the vehicle and a location on the path before the unplanned obstacle. The trajectory planner 134 may plan the second trajectory function for the second segment of the path between the current location of the vehicle and the location on the path before the unplanned obstacle. The trajectory planner 134 may determine the second trajectory in a similar manner as described above regarding FIG. 3. The trajectory planner 134 may select a three-phase jerk profile for a reactive stop. However, because the vehicle should plan to stop before hitting the unplanned obstacle, the final velocity ($v_f$) may be set to 0, and the length (L) may be solved.

In an example, the trajectory planner 134 may select initial acceptable acceleration and jerk parameters within a range of maximum parameters. The trajectory planner then solves the parameterized profile for the length L. If the length L is greater than a stopping distance to the point before the unplanned obstacle, e.g., pedestrian, the trajectory planner 134 may iteratively increase the magnitude of the acceptable acceleration and jerk parameters within the range of maximum parameters until the length L of the new segment is less than the stopping distance to the point before the unplanned obstacle.

Figure 6:
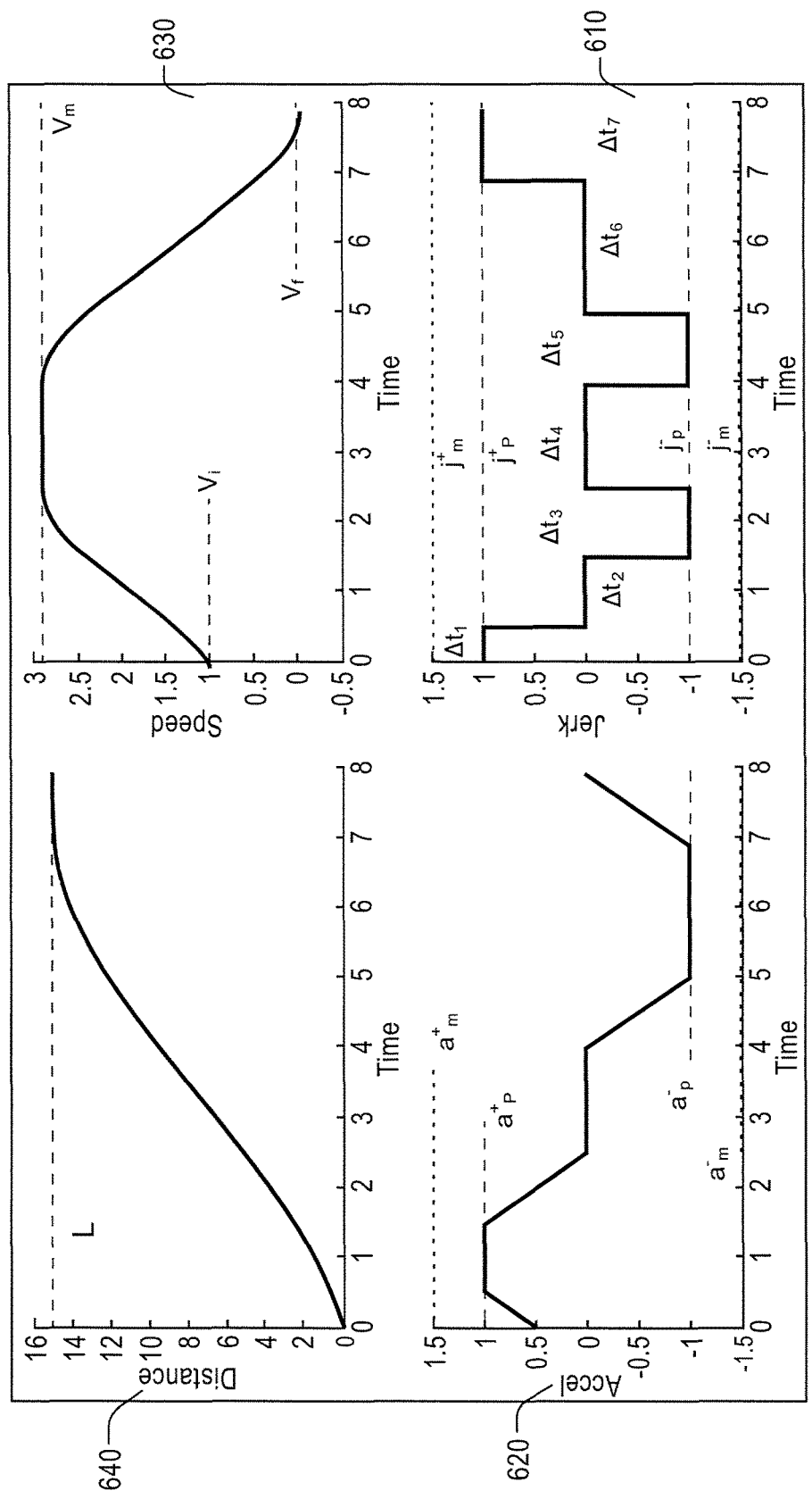
FIG. 6 illustrates an example of trajectory functions using a seven-phase profile in accordance with aspects of the present disclosure.

FIG. 6 graphically illustrates exemplary trajectory functions for a seven-phase profile. For example, the seven-phase profile may be used for a straight section of road where the vehicle accelerates to a speed limit, travels at the speed limit, and then slows to a stop at a stop sign. A jerk function 610 represents the seven constant jerk phases as horizontal portions. As illustrated, each of the phases may have a value of either −j, 0, or +j, where −j and +j may be the acceptable jerk parameters. A corresponding acceleration function 620 illustrates the acceleration during each of the phases. Accordingly, the first phase of increasing acceleration (Δt1), a second phase of constant acceleration (Δt2), a third phase of decreasing acceleration (Δt3), a fourth phase of no acceleration (Δt4), a fifth phase of increasing deceleration (Δt5), a sixth phase of constant deceleration (Δt6), and a seventh phase of decreasing deceleration (Δt7) are shown. As illustrated, the acceleration function 620 remains within the range of $a_p^-$ to $a_p^+$, which may be the acceptable acceleration parameters. A speed function 630 illustrates the speed starting at $v_i$, increasing to $v_m$ and ending at $v_f$, which in this case is 0, indicating the vehicle 102) will stop at the end of the segment. The distance function 640 illustrates the total distance (L) traveled by the vehicle 102 over time.

Figure 7:
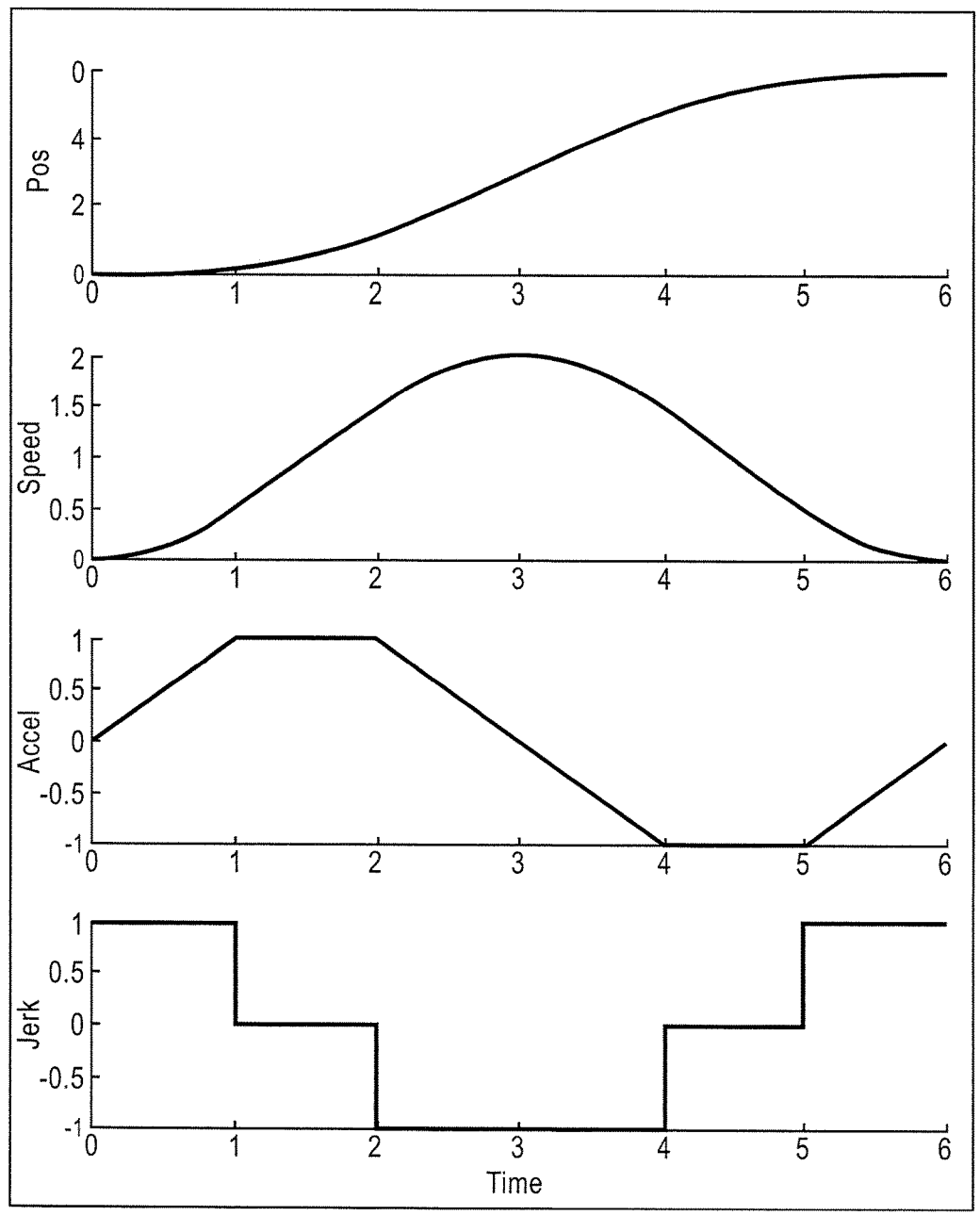
FIG. 7 illustrates an example of trajectory functions using a six-phase profile in accordance with aspects of the present disclosure.

FIG. 7 illustrates exemplary trajectory functions for a six-phase jerk profile. The six-phase jerk profile may be used, for example, when the segment does not have enough length for the vehicle 102 to reach top speed before needing to start slowing down. The vehicle 102 may smoothly accelerate, then gradually reduce the speed of acceleration and begin decelerating, coming to a gradual stop. The six-phase jerk profile may have multiple solutions, for example, due to the constant acceleration phases. A solution having a positive time interval for all phases may be selected.

Figure 8:
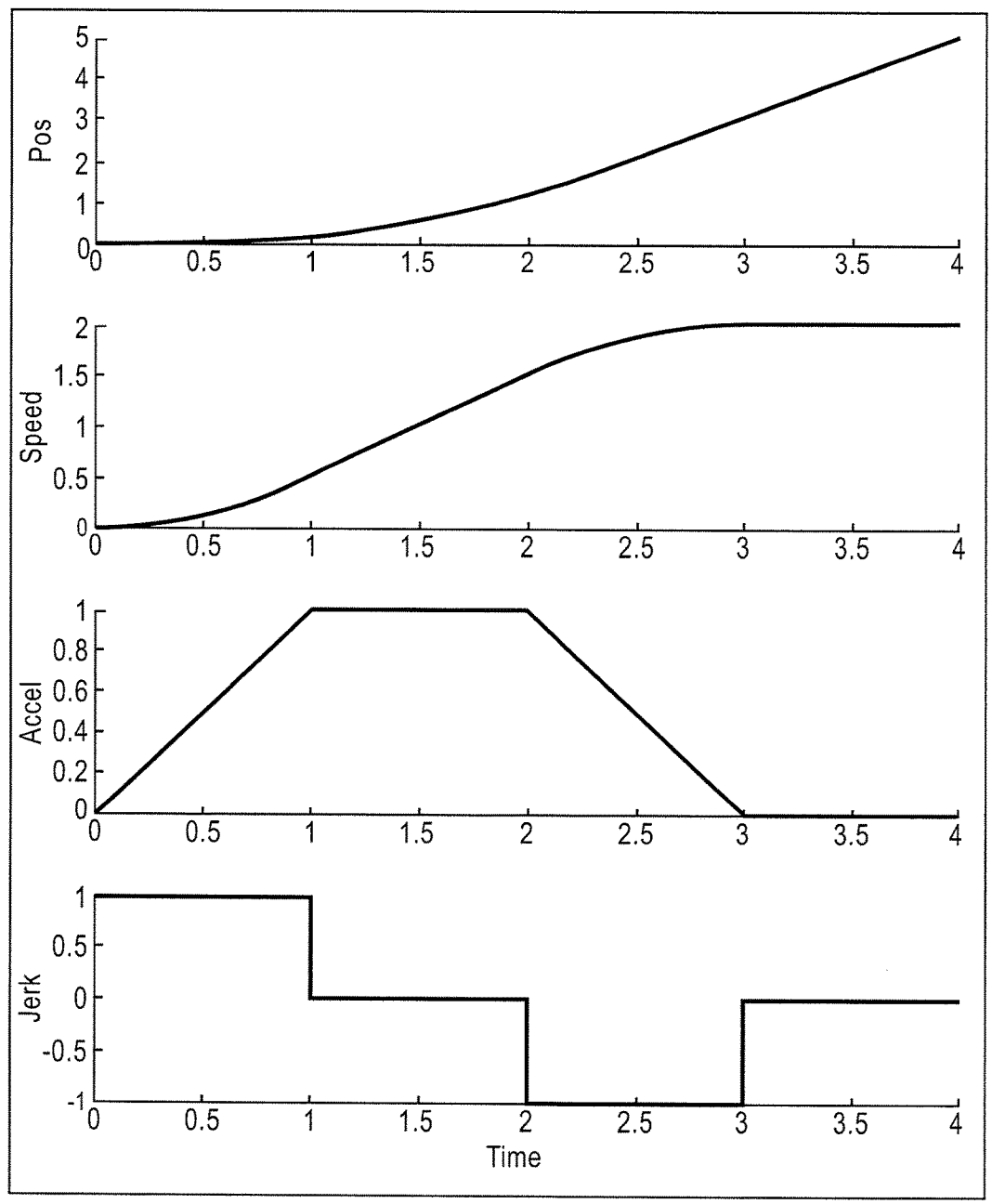
FIG. 8 illustrates an example of trajectory functions using a four-phase profile, in accordance with aspects of the present disclosure.

FIG. 8 illustrates exemplary trajectory functions for a four-phase jerk profile. The four-phase jerk profile may be used when the initial speed is lower than the final speed, which is close to the maximum speed. The vehicle may simply increase speed to the final speed and then maintain the final speed, for example.

Figure 9:
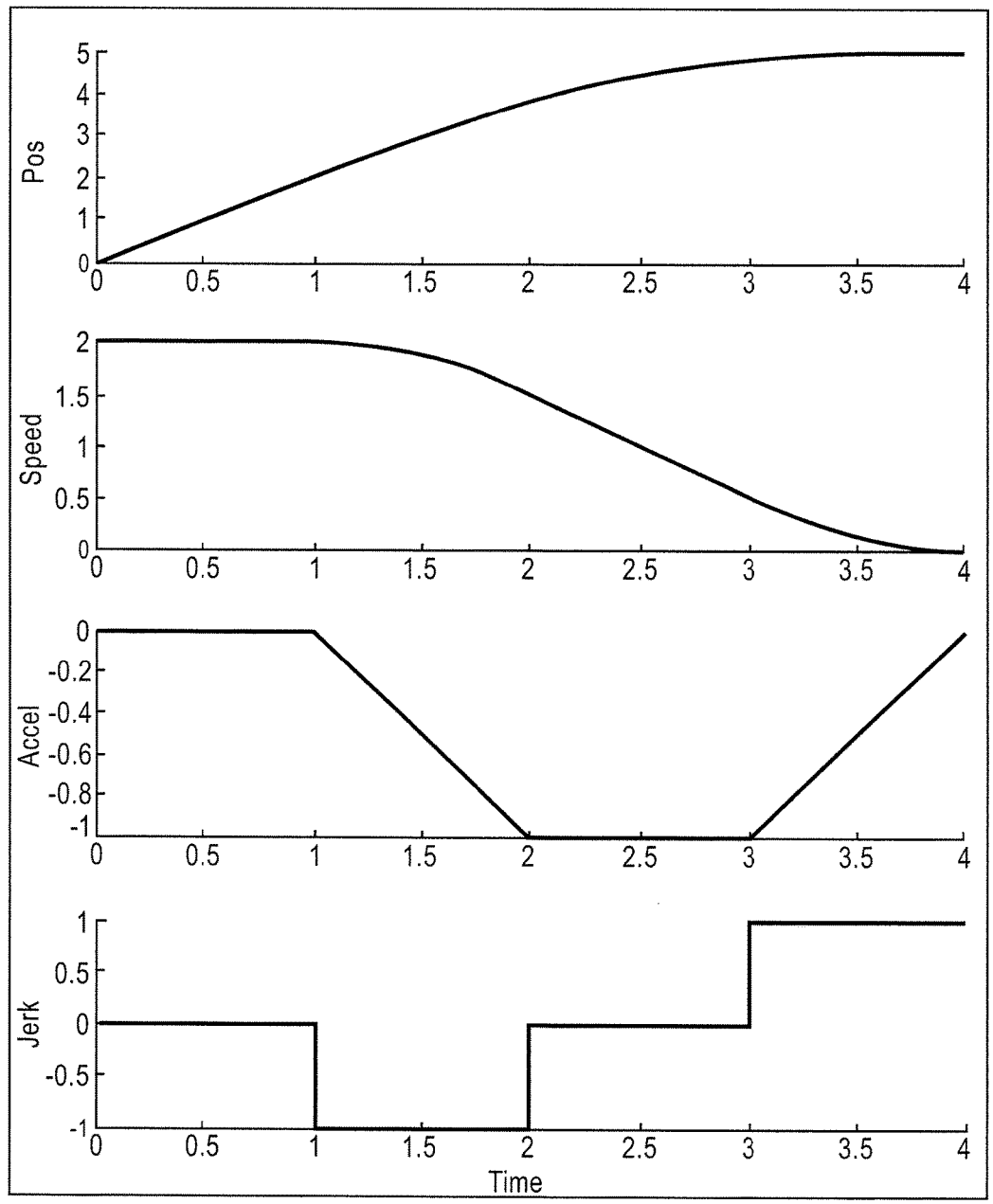
FIG. 9 illustrates an example of trajectory functions using a reversed four-phase profile, in accordance with aspects of the present disclosure.

FIG. 9 illustrates exemplary trajectory functions for a reverse four-phase jerk profile. The reverse four-phase jerk profile may be used when the initial speed is close to the maximum speed and the final speed is lower than the initial speed, for example. It may be inefficient in terms of time to immediately start slowing the vehicle. Instead, the vehicle may continue at the initial speed for a period, and then begin decelerating.

Figure 10:
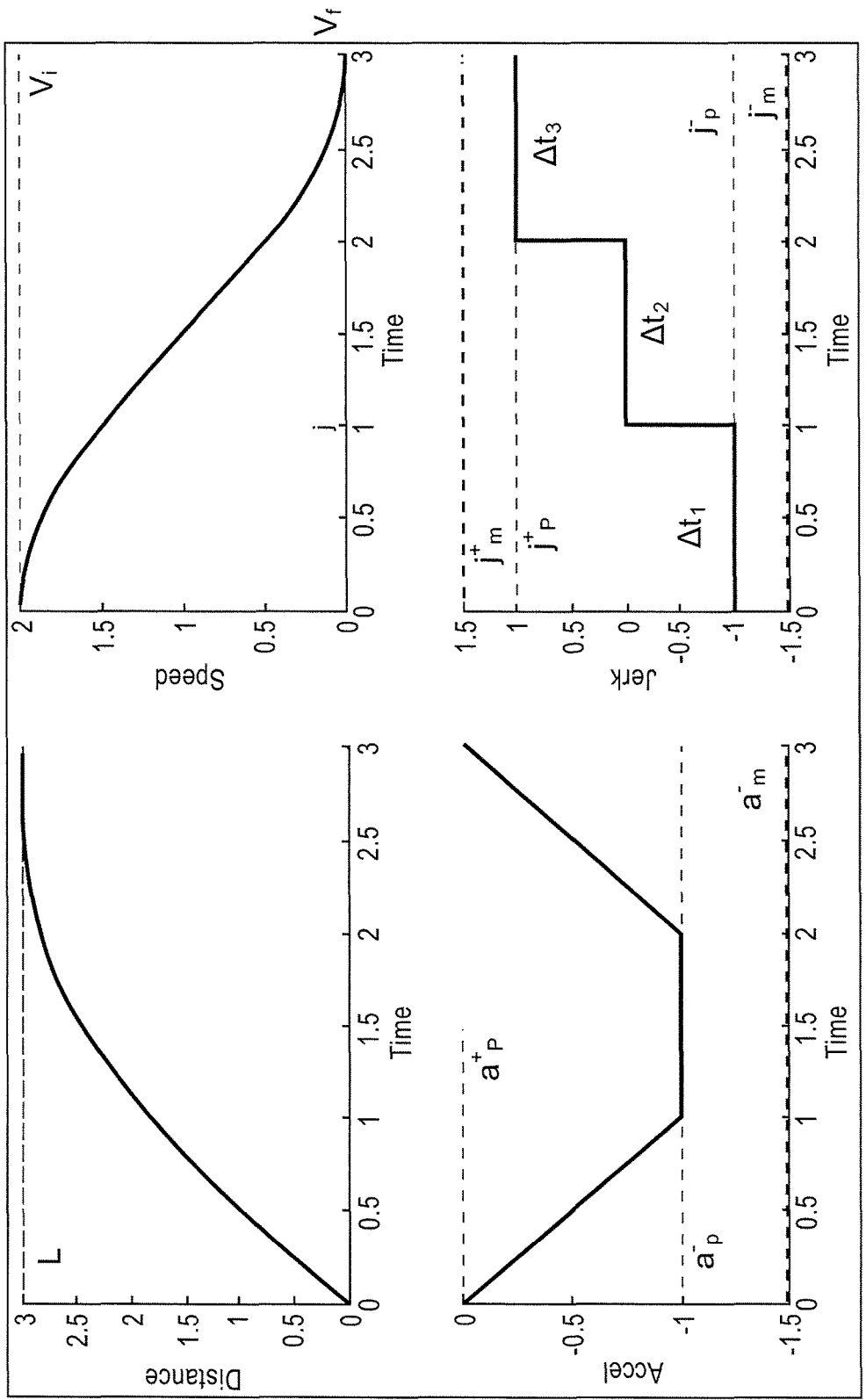
FIG. 10 illustrates an example of trajectory functions using a three-phase profile, in accordance with aspects of the present disclosure.

FIG. 10 illustrates example trajectory functions for a three-phase jerk profile. The three-phase jerk profile may be used when the vehicle should change speed for the entire segment, for example, when accelerating onto a highway or in a reactive stop scenario. When solving for the three-phase profile, only one of L and $v_f$ may be strictly enforced while $v_i$ and $a_i$ are fixed. In a normal mode operation, the $v_f$ may be allowed to diverge from the desired target and the $v_i$ of the subsequent segment may be updated. In a reactive stop scenario, the $v_f$ may be set to 0, and the acceleration and jerk parameters may be tuned, e.g., incrementally increased, if the resulting L value is greater than a distance to the unplanned obstacle. The trajectory planning system 110 may provide an alert to passengers if the acceleration or jerk parameters are tuned beyond a threshold value.

FIG. 11 representatively illustrates an example scenario where the vehicle 102 is operating in a normal mode and a pedestrian 1110 is present. The trajectory planner 134 may determine the location of the pedestrian 1110, a required stopping distance 1120, and a stop buffer 1130. In this case, the trajectory planner 134 may continue with the current trajectory or select a reversed four-phase jerk profile because the pedestrian 1110 is not within the stop buffer 1130

FIG. 12 representatively illustrates an example scenario where the vehicle 102 is operating in a reactive stop mode and the pedestrian 1110 is present. The pedestrian 1110 is now within the stop buffer 1130. A re-plan buffer 1140 is determined based on the position of the pedestrian 1110. The re-plan buffer 1140 provides space for the vehicle 102 to select a different path if the pedestrian 1110 does not move. The trajectory planner 134 may set the start of the re-plan buffer 1140 as the end of a segment when planning a trajectory in the reactive stopping state.

Figure 13:
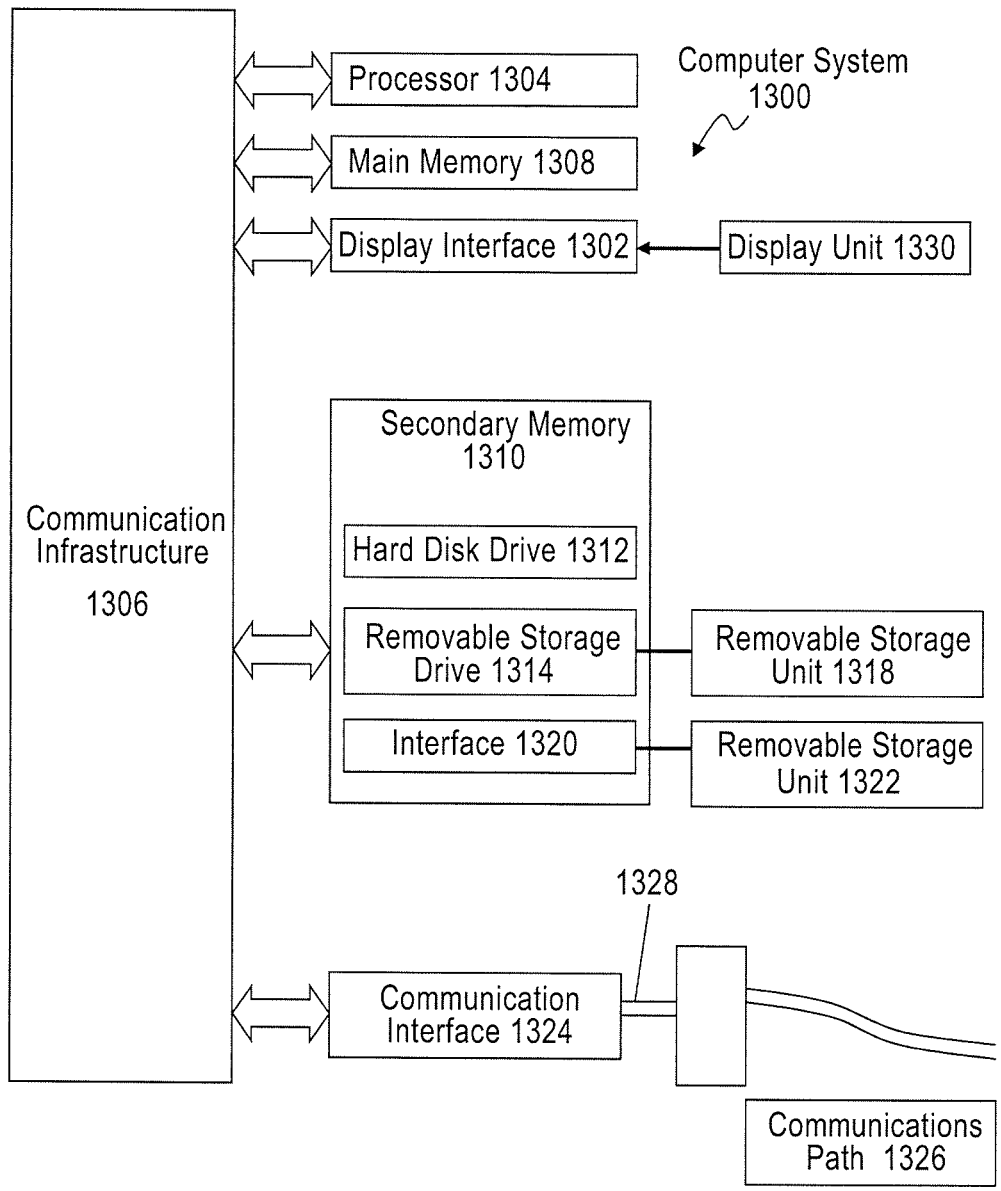
FIG. 13 presents an exemplary system diagram of various hardware components and other features, for use in accordance with aspects of the present disclosure, in accordance with aspects of the present disclosure.

Aspects of the present disclosure may be implemented using hardware, software, or a combination thereof and may be implemented in one or more computer systems or other processing systems. In one aspect, the disclosure is directed toward one or more computer systems capable of carrying out the functionality described herein. FIG. 13 presents an example system diagram of various hardware components and other features that may be used in accordance with aspects of the present disclosure. Aspects of the present disclosure may be implemented using hardware, software, or a combination thereof and may be implemented in one or more computer systems or other processing systems. In one exemplary variation, aspects of the disclosure are directed toward one or more computer systems capable of carrying out the functionality described herein. An example of such a computer system 1300 is shown in FIG. 13.

Computer system 1300 includes one or more processors, such as processor 1304. The processor 1304 is connected to a communication infrastructure 1306 (e.g., a communications bus, cross-over bar, or network). Various software aspects are described in terms of this example computer system. After reading this description, it will become apparent to a person skilled in the relevant art(s) how to implement aspects of the disclosure using other computer systems and/or architectures.

Computer system 1300 may include a display interface 1302 that forwards graphics, text, and other data from the communication infrastructure 1306 (or from a frame buffer not shown) for display on a display unit 1330. Computer system 1300 also includes a main memory 1308, preferably random access memory (RAM), and may also include a secondary memory 1310. The secondary memory 1310 may include, for example, a hard disk drive 1312 and/or a removable storage drive 1314, representing a floppy disk drive, a magnetic tape drive, an optical disk drive, etc. The removable storage drive 1314 reads from and/or writes to a removable storage unit 1318 in a well-known manner. Removable storage unit 1318, represents a floppy disk, magnetic tape, optical disk, etc., which is read by and written to removable storage drive 1314. As will be appreciated, the removable storage unit 1318 includes a computer usable storage medium having stored therein computer software and/or data.

In alternative aspects, secondary memory 1310 may include other similar devices for allowing computer programs or other instructions to be loaded into computer system 1300. Such devices may include, for example, a removable storage unit 1322 and an interface 1320. Examples of such may include a program cartridge and cartridge interface (such as that found in video game devices), a removable memory chip (such as an erasable programmable read only memory (EPROM), or programmable read only memory (PROM)) and associated socket, and other removable storage units 1322 and interfaces 1320, which allow software and data to be transferred from the removable storage unit 1322 to computer system 1300.

Computer system 1300 may also include a communications interface 1324. Communications interface 1324 allows software and data to be transferred between computer system 1300 and external devices. Examples of communications interface 1324 may include a modem, a network interface (such as an Ethernet card), a communications port, a Personal Computer Memory Card International Association (PCMCIA) slot and card, etc. Software and data transferred via communications interface 1324 are in the form of signals 1328, which may be electronic, electromagnetic, optical or other signals capable of being received by communications interface 1324. These signals 1328 are provided to communications interface 1324 via a communications path (e.g., channel) 1326. This path 1326 carries signals 1328 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 1380, a hard disk installed in hard disk drive 1370, and signals 1328. These computer program products provide software to the computer system 1300. Aspects of the disclosure are directed to such computer program products.

Computer programs (also referred to as computer control logic) are stored in main memory 1308 and/or secondary memory 1310. Computer programs may also be received via communications interface 1324. Such computer programs, when executed, enable the computer system 1300 to perform various features in accordance with aspects of the present disclosure, as discussed herein. In particular, the computer programs, when executed, enable the processor 1310 to perform such features. Accordingly, such computer programs represent controllers of the computer system 1300.

In variations where aspects of the disclosure are implemented using software, the software may be stored in a computer program product and loaded into computer system 1300 using removable storage drive 1314, hard drive 1312, or communications interface 1320. The control logic (software), when executed by the processor 1304, causes the processor 1304 to perform the functions in accordance with aspects of the disclosure as described herein. In another variation, aspects are implemented primarily in hardware using, for example, hardware components, such as application specific integrated circuits (ASICs). Implementation of the hardware state machine so as to perform the functions described herein will be apparent to persons skilled in the relevant art(s).

In yet another example variation, aspects of the disclosure are implemented using a combination of both hardware and software.

Figure 14:
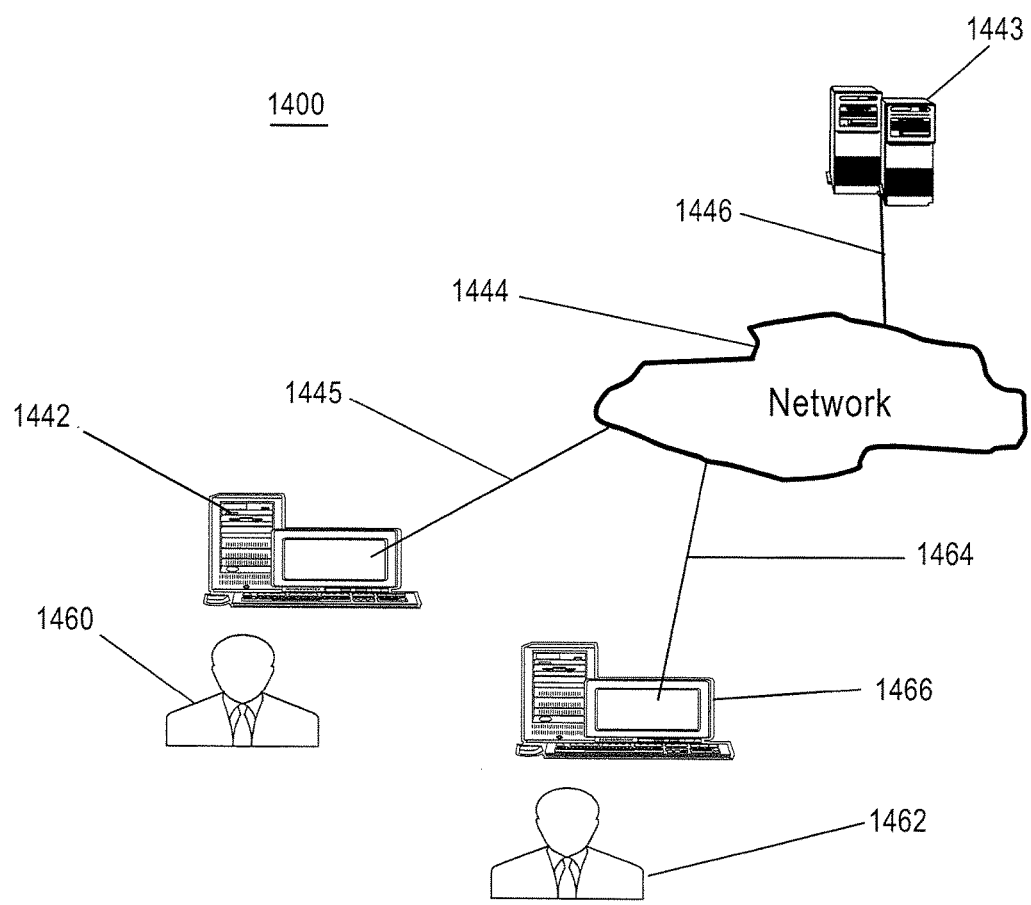
FIG. 14 is a block diagram of various exemplary system components, for use in accordance with aspects of the present disclosure.

FIG. 14 is a block diagram of various example system components that may be used in accordance with aspects of the present disclosure. For example, the various components may be within the vehicle 102, or only some of the components may be within the vehicle 102, and other components may be remote from the vehicle 102. The system 1400 includes one or more accessors 1460, 1462 (also referred to interchangeably herein as one or more "users") and one or more terminals 1442, 1466 (such terminals may be or include, for example, various features of the trajectory planning system 110). In one aspect, data for use in accordance with aspects of the present disclosure is, for example, input and/or accessed by accessors 1460, 1462 via terminals 1442, 1466, such as personal computers (PCs), minicomputers, mainframe computers, microcomputers, telephonic devices, or wireless devices, such as personal digital assistants ("PDAs") or a hand-held wireless devices coupled to a server 1443, such as a PC, minicomputer, mainframe computer, microcomputer, or other device having a processor and a repository for data and/or connection to a repository for data, via, for example, a network 1444, such as the Internet or an intranet, and couplings 1445, 1446, 1464. The couplings 1445, 1446, 1464 include, for example, wired, wireless, or fiberoptic links. In another example variation, the method and system in accordance with aspects of the present disclosure operate in a stand-alone environment, such as on a single terminal.

The aspects of the disclosure discussed herein may also be described and implemented in the context of computer-readable storage medium storing computer-executable instructions. Computer-readable storage media includes computer storage media and communication media. For example, flash memory drives, digital versatile discs (DVDs), compact discs (CDs), floppy disks, and tape cassettes. Computer-readable storage media may include volatile and nonvolatile, removable and non-removable media implemented in any method or technology for storage of information such as computer readable instructions, data structures, modules or other data.

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A method of autonomous guidance of a vehicle comprising:
    fitting a first jerk profile including a plurality of phases within a set of acceptable parameters including: a positive jerk constraint, a negative jerk constraint, a positive acceleration constraint, and a negative acceleration constraint for a first segment of a planned travel path, a jerk value being constant within each phase of the first jerk profile;
    parameterizing the first jerk profile based on an initial velocity, an initial acceleration, a final velocity, a final acceleration for the first segment, and a maximum legal speed limit for the first segment;
    integrating the first jerk profile to determine a first trajectory function, the first trajectory function including a speed for the vehicle at a given time;
    travelling the first segment of the path according to the first trajectory function;
    detecting an unplanned obstacle along the first segment of the path; and planning a second trajectory function for a second segment of the path between a current location of the vehicle and a location on the path before the unplanned obstacle.

2. The method of claim 1, wherein planning the second trajectory function for the second segment comprises:
    fitting a second jerk profile including a second plurality of phases within the set of acceptable parameters;
    parameterizing the second jerk profile based on a velocity when the object is detected, an acceleration when the object is detected, a final velocity of zero, and a final acceleration of zero; and
    integrating the second jerk profile to determine the second trajectory function.

3. The method of claim 2, wherein the second jerk profile includes an increasing deceleration phase, a constant deceleration phase, and a decreasing deceleration phase.

4. The method of claim 3, wherein parameterizing the second jerk profile comprises:
    solving the second trajectory function for a stopping distance;
    determining that the stopping distance is greater than a length of the second segment; and
    iteratively increasing a magnitude of each parameter of the set of acceptable parameters until the stopping distance is less than the length of the second segment.

5. The method of claim 1, wherein parameterizing the first jerk profile comprises:
    solving the first trajectory function for a duration of each phase;
    determining that the duration for at least one phase is negative; and
    increasing a magnitude of each parameter of the set of acceptable parameters until the duration for each phase is positive or each parameter of the set of acceptable parameters reaches a maximum magnitude.

6. The method of claim 1, wherein fitting the first jerk profile including a plurality of phases to constraints for the first segment comprises:
    selecting the first jerk profile from a plurality of jerk profiles, each of the plurality of jerk profiles having a different numbers of phases, wherein the selecting includes evaluating each of the jerk profiles in descending order of the number of phases until a jerk profile provides a solution within the constraints having a positive duration for each phase.

7. The method of claim 1, further comprising:
    projecting a vehicle current position onto the first segment;
    determining a cumulative distance along the first segment between a start point and the projected vehicle current position;
    determining a reference time for the vehicle current position in the first trajectory function based on the cumulative distance; and
    determining a desired speed for the vehicle by sampling the first trajectory function based on the reference time.

8. The method of claim 1, further comprising:
    determining that the unplanned obstacle has cleared the path; and
    planning a third trajectory function for a third segment of the path between a current location of the vehicle and an end of the first segment.

9. The method of claim 1, further comprising:
    determining an alternative path that avoids the unplanned obstacle;
    determining whether the alternate path is feasible; and
    planning a trajectory function for the alternate path.

10. A system for autonomous guidance of a vehicle comprising:
    a map database providing map data including a path for the vehicle;
    a detection system determining a position of an unplanned obstacle on the path;
    a processor:

fitting a first jerk profile including a plurality of phases within a set of acceptable parameters including: a positive jerk constraint, a negative jerk constraint, a positive acceleration constraint, and a negative acceleration constraint for a first segment of a planned travel path, a jerk value being constant within each phase of the first jerk profile, wherein the processor selects the first jerk profile from a plurality of jerk profiles, each of the plurality of jerk profiles having different numbers of phases, wherein the selecting includes evaluating each of the jerk profiles in descending order of the number of phases until a jerk profile provides a solution within the constraints;

parameterizing the first jerk profile based on an initial velocity, an initial acceleration, a final velocity, and a final acceleration for the first segment;

integrating the first jerk profile to determine a first trajectory function, the first trajectory function including a speed for the vehicle at a given time;

guiding the vehicle along the first segment of the path according to the first trajectory function;

detecting an unplanned obstacle along the first segment of the path; and planning a second trajectory function for a second segment of the path between a current location of the vehicle and a location on the path before the unplanned obstacle.

11. The system of claim 10, wherein the processor planning the second trajectory function for the second segment comprises the processor:

fitting a second jerk profile including a second plurality of phases within the maximum positive jerk constraint, the maximum negative jerk constraint, the maximum positive acceleration constraint, and the maximum negative acceleration constraint;

parameterizing the second jerk profile based on a velocity when the object is detected, an acceleration when the object is detected, a final velocity of zero, and a final acceleration of zero; and integrating the second jerk profile to determine the second trajectory function.

12. The system of claim 11, wherein the second jerk profile includes an increasing deceleration phase, a constant deceleration phase, and a decreasing deceleration phase.

13. The system of claim 12, wherein the processor:

solves the second trajectory function for a stopping distance;

determines that the stopping distance is greater than a length of the second segment; and iteratively increases a magnitude of each parameter of the set of acceptable parameters until the stopping distance is less than a length of the second segment.

14. The system of claim 10, wherein the processor:

projects a vehicle current position onto the first segment;

determines a cumulative distance along the first segment between a start point and the projected vehicle current position;

determines a reference time for the vehicle current position in the first trajectory function based on the cumulative distance; and determines a desired speed for the vehicle by sampling the first trajectory function based on the reference time.

15. The system of claim 10, wherein the processor:

determines that the unplanned obstacle has cleared the path; and plans a third trajectory function for a third segment of the path between a current location of the vehicle and an end of the first segment.

16. The system of claim 10, wherein the processor:

determines an alternative path that avoids the unplanned obstacle;

determines whether the alternate path is feasible; and plans a trajectory function for the alternate path.

17. A non-transitory computer-readable medium storing computer executable code for controlling an autonomous vehicle, comprising code to:

fit a first jerk profile including a plurality of phases within a maximum positive jerk constraint, a maximum negative jerk constraint, a maximum positive acceleration constraint, and a maximum negative acceleration constraint for a first segment of a planned travel path, a jerk value being constant within each phase of the first jerk profile;

parameterize the first jerk profile based on an initial velocity, an initial acceleration, a final velocity, and a final acceleration for the first segment;

integrate the first jerk profile to determine a first trajectory function, the first trajectory function including a speed for the vehicle at a given time;

guide the vehicle along the first segment of the path according to the first trajectory function;

detect an unplanned obstacle along the first segment of the path; and plan a second trajectory function for a second segment of the path between a current location of the vehicle and a location on the path before the unplanned obstacle, wherein the code to plan the second trajectory function comprises code to:

fit a second jerk profile including a second plurality of phases within the maximum positive jerk constraint, the maximum negative jerk constraint, the maximum positive acceleration constraint, and the maximum negative acceleration constraint;

parameterize the second jerk profile based on a velocity when the object is detected, an acceleration when the object is detected, a final velocity of zero, and a final acceleration of zero; and integrate the second jerk profile to determine the second trajectory function.

* * * * *